(12) United States Patent
Kluenker et al.

(10) Patent No.: US 6,474,855 B1
(45) Date of Patent: Nov. 5, 2002

(54) ADJUSTABLE FIXING ELEMENT

(75) Inventors: Ulrich Kluenker, Tamm; Gerald Hiesl, Herrenberg; Peter Heimpel, Tiefenbronn, all of (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 09/659,678

(22) Filed: Sep. 11, 2000

(30) Foreign Application Priority Data

Sep. 11, 1999 (DE) .......................................... 199 43 535

(51) Int. Cl.⁷ ............................ F21V 19/02; F21V 21/14
(52) U.S. Cl. ...................... 362/523; 362/524; 362/273; 362/289; 74/89.23
(58) Field of Search ................................ 362/523, 273, 362/289, 524; 74/89.23

(56) References Cited

U.S. PATENT DOCUMENTS

| | | | | |
|---|---|---|---|---|
| 4,471,713 A | * | 9/1984 | Dick | 362/80 |
| 4,675,794 A | * | 6/1987 | Fink, Jr. et al. | 362/289 |
| 5,951,157 A | * | 9/1999 | Shirai et al. | 362/529 |
| 6,036,341 A | * | 3/2000 | Dobler et al. | 362/524 |
| 6,280,070 B1 | * | 8/2001 | Ishida et al. | 362/523 |
| 6,315,438 B1 | * | 11/2001 | Shirai et al. | 362/507 |

FOREIGN PATENT DOCUMENTS

DE 195 46 703 C1 9/1997

OTHER PUBLICATIONS

"Automatic Screw Mounting," Publishing House Hans-Herbert Monning, Iserlohn, 1st Edition 1993, pp. 11–13.

* cited by examiner

Primary Examiner—Thomas M. Sember
Assistant Examiner—Jacob Y. Choi
(74) Attorney, Agent, or Firm—Crowell & Moring LLP

(57) ABSTRACT

An adjustable fixing element, particularly for headlights of motor vehicles, has a setscrew on which a first screw element and a second screw element are arranged with locating surfaces which face each other. In order to create an adjustable fixing device which can be adjusted higher from the side of the plate facing away from the object to be fixed or from another holder, it is proposed to provide a handling aid on the first screw element which projects beyond its locating surface. The second screw element exhibits a corresponding recess in its locating surface for receiving the handling aid of the first screw element.

13 Claims, 1 Drawing Sheet

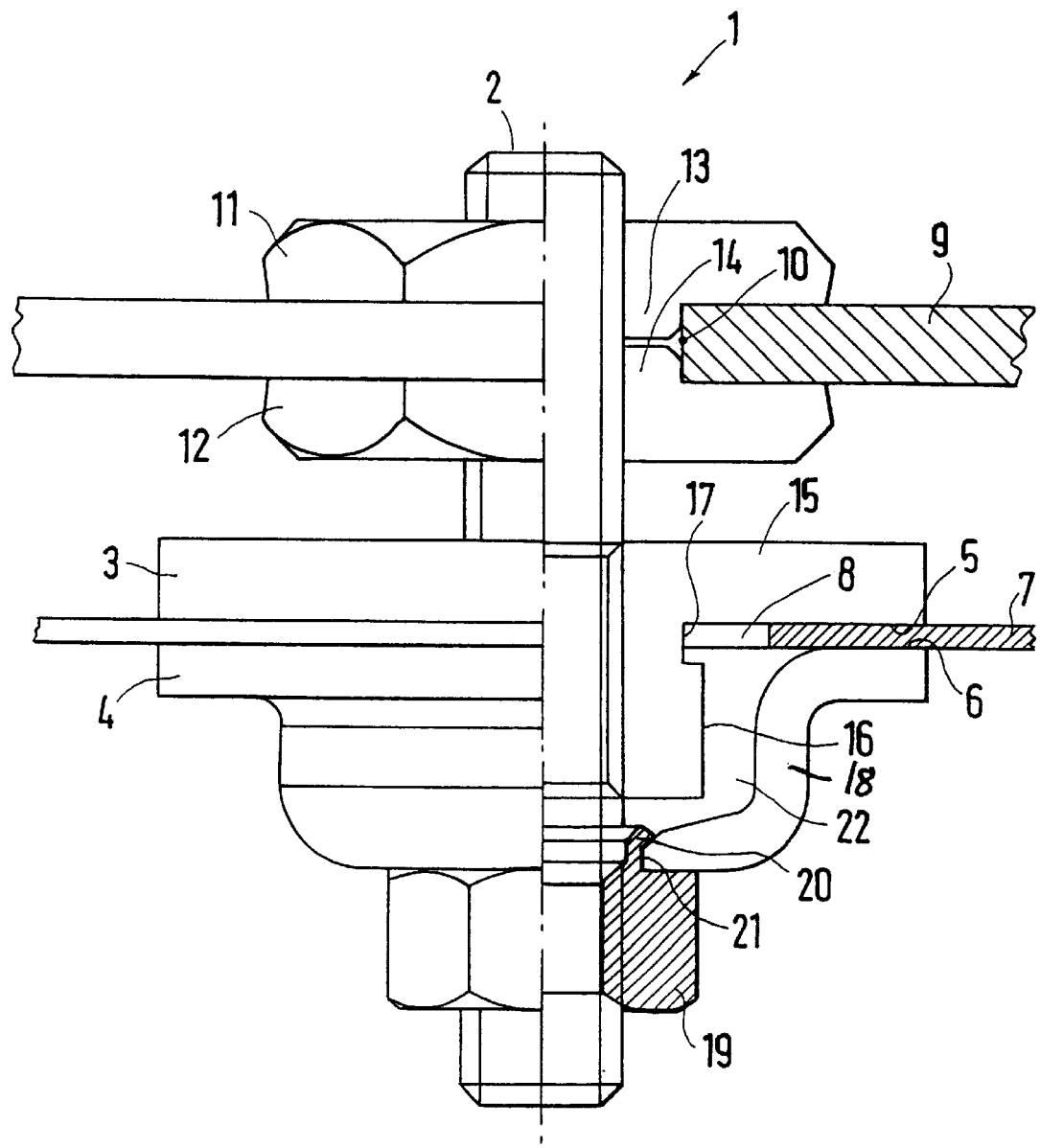

ADJUSTABLE FIXING ELEMENT

BACKGROUND AND SUMMARY OF THE INVENTION

This application claims the priority of German patent document 199 43 535.9, filed Sep. 11, 1999, the disclosure of which is expressly incorporated by reference herein.

The present invention relates to an adjustable fixing element with a setscrew on which a first screw element and a Add second screw element are arranged with locating surfaces which face each other.

Fixing elements often have the task of positioning the parts to be fixed relative to one another. In the present case the aim is to fix an element, such as a headlight, for example, to a plate-type object such as a plate in a motor vehicle body in an adjustable fashion. A generally known fixing element consists of a setscrew which is held on an object to be fixed, where two nuts, supplied with washers as appropriate, are arranged on the setscrew, and the plate is positioned between the nuts. Adjustment of the fixing element is by turning the nut facing the object to be fixed. Fixing in the desired position is secured by tightening of the second nut which faces away from the object to be fixed.

With this state of the art as a basis, an aim of the invention is to create an adjustable fixing device which can be adjusted higher from the side of the plate which faces away from the object to be fixed or from another holder.

This aim is fulfilled in the present invention by providing an adjustable fixing element with a setscrew on which a first screw element and a second screw element are arranged with locating surfaces which face each other wherein the first screw element is provided with a handling aid which projects beyond its locating surface and wherein the second screw element exhibits a corresponding recess adjacent its locating surface for acceptance of the handling aid.

It is proposed according to preferred embodiments that, starting from a fixing element, which is known, consisting of a setscrew on which two screw elements are arranged whose locating surfaces face each other, a handling aid should be arranged on the first screw element, which projects over the locating surface of the screw element. The first screw element preferably faces towards the object to be fixed; the handling aid then is positioned on the side of the screw element facing away from the object to be fixed. The second screw element exhibits a corresponding recess in its locating surface for acceptance of the handling aid of the first screw element. An advantage of a fixing element formed in this way is that it is possible to adjust the fixing element when the side of the fixing element facing toward the object to be fixed is not accessible. As the handling aid provided on the first screw element extends through a fixing opening, the handling aid can be grasped from the side facing away from the object to be fixed and adjustment can be achieved by turning of the first screw element.

The handling aid is preferably in the form of a nut which is connected to a disk-shaped base element which at the same time forms the locating surface. The handling aid can, however, also be in the form of a knurling or similar.

The second screw element is formed in such a way that it exhibits a corresponding recess in its locating surface for the reception of the handling aid of the first screw element. This is preferably achieved by means wherein the second screw element consists of a pot-shaped base element with which a nut is connected, preferably in a rotatable fashion. The pot-shaped base element is supported on the outer side of the fixing opening with its edge as locating surface, and the nut is tightened on the setscrew in order to secure the setting of the fixing element. Base element and nut do not have to be connected with each other, however, such connection improves ease of handling. If a rotatable connection is provided between the base element and the nut, relative movement between the base element and the edge fixing opening which can cause mutual damage is prevented. Instead, there is only relative movement between the base element and the nut.

In order to connect the nut with the base element it is proposed to provide an opening in the base element through which a ring-type collar of the nut is pushed. Then this collar is beaded in such a way that altogether a rotatable connection between base element and nut is created which is only effective in the axial direction.

Other objects, advantages and novel features of the present invention will become apparent from the following detailed description of the invention when considered in conjunction with the accompanying drawings.

BRIEF DESCRIPTION OF THE DRAWINGS

The single drawing FIGURE schematically depicts an adjustable fixing element constructed according to a preferred embodiment of the invention.

DETAILED DESCRIPTION OF THE DRAWINGS

The fixing element 1 shown in the drawing comprises a central setscrew 2 on which two screw elements 3 and 4 are held with locating surfaces 5 and 6 facing each other. A metal plate 7 belonging to the car body is held between locating surfaces 5, 6 in which a fixing opening 8 is provided.

The fixing element 1 shown in the drawing is connected with a wall 9 of a bearing cup for a vehicle headlight which is (not shown.) In wall 9 a second fixing opening 10 is provided through which setscrew 2 is led. A third and fourth screw element 11,12 are arranged on setscrew 2 for connection of fixing element 1 with wall 9, between which wall 9 is accommodated. Screw elements 11,12 are designed so as to be flat on the sides facing away from wall 9, while on the sides facing wall 9, cylindrical extensions 13, 14 are provided. The outer diameter of extensions 13, 14 correspond to the internal diameter of the second fixing opening 10, so that the whole of fixing element 1 is held in the second fixing opening 10 without free play in the radial direction.

The first screw element 3 consists of a disk-shaped base element 15, with which a nut 16 is connected as a handling aid. In the present embodiment, base element 15 and nut 16 are formed in one piece. The outer diameter of nut 16 is selected so as to be smaller than the internal diameter of the first fixing opening 8. A circumferential groove 17 is provided between nut 16 and base element 15 in fixing opening 8 in order in increase the radial adjustment range of fixing element 1.

The second screw element 4 comprises a pot-shaped base element 18 with a recess 22 on which a nut 19 is held in a rotatable fashion. A circumferential collar 20 is provided on nut 19 for the connection of base element 18 and nut 19, which is positioned through a central opening 21 provided through the floor of base element 18. Collar 20 is beaded so that base element 18 is connected with nut 19 in an axial direction.

In order to mount the headlight, the third and fourth screw elements 11,12 are fixed to wall 9 and the first screw element 3 positioned on setscrew 2. Nut 16 of the first screw element 3 is pushed through the first fixing opening 8 until locating surface 5 rests against metal car body element 7. By gripping nut 16 with a tool or by hand then turning it, the axial position of the first screw element 3 on setscrew 2 is changed until the bearing cup and therefore the headlight has reached its specified position. Then the second screw element 4 is screwed onto setscrew in order to secure the adjustment setting of fixing element 1. Here nut 16 of the first screw element 3 is completely accepted by recess 22 of the second screw element 4 without touching pot-shaped base element 18. This ensures that the position of first screw element 3 is not changed further.

If the headlamp is to be dismantled, the third screw element 11 can also be loosened in order to release the headlight if the second screw element 4 is not accessible. It is then possible to adjust the fixing element during reassembly of the headlight by turning the fourth screw element 12. If it is also necessary to carry out adjustment radially in relation to setscrew 2, the third and fourth screw elements 11,12 are turned round and positioned on setscrew 2 in such a way that their flat surfaces face wall 9. As the second fixing opening 10 is now no longer filled by cylindrical extensions 13,14, fixing element 1 can be radially adjusted by sliding within the second fixing opening 10.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Adjustable fixing element with a setscrew on which a first screw element and a second screw element are arranged with opposing locating surfaces which face each other,
   wherein the first screw element is provided with a handling aid which projects beyond said opposing locating surfaces, and
   wherein the second screw element exhibits a corresponding recess adjacent said opposing locating surfaces for acceptance of the handling aid and the second screw element comprises a pot-shaped base element, which exhibits the recess and with which a nut is connected in rotatable fashion.

2. Adjustable fixing element according to claim 1, wherein the first screw element comprises a disk-shaped base element, with which a nut is connected as the handling aid.

3. Adjustable fixing element according to claim 1, wherein the pot-shaped base element and nut are connected with each other by beading.

4. Adjustable fixing element with a setscrew on which a first screw element and a second screw element are arranged with opposing locating surfaces which face each other,
   wherein the first screw element is provided with a handling aid which projects beyond said opposing locating surfaces and wherein the first screw element comprises a disk-shaped base element, with which a nut is connected as the handling aid, and
   wherein the second screw element exhibits a corresponding recess adjacent said opposing locating surfaces for acceptance of the handling aid and the second screw element comprises a pot-shaped base element, which exhibits the recess and with which a nut is connected in rotatable fashion.

5. Adjustable fixing element according to claim 4, wherein the pot-shaped base element and nut are connected with each other by beading.

6. A vehicle headlight adjusting assembly operable to adjust relative positions of a fixed vehicle body part and a headlight bearing part, comprising:
   a setscrew;
   first and second screw elements threadedly carried on the setscrew and including respective locating surfaces facing each other and operable to clamp one of the fixed vehicle body part and headlight bearing part therebetween,
   wherein the first screw element is provided with a handling aid which projects beyond said locating surfaces, and
   wherein the second screw element exhibits a corresponding recess adjacent said locating surfaces for acceptance of the handling aid and the second screw element comprises a pot-shaped base element, which exhibits the recess and with which a nut is connected in rotatable fashion.

7. An adjusting assembly according to claim 6, wherein the locating surfaces of the first and second screw elements are operable to clamp a fixed vehicle body part therebetween.

8. An adjusting assembly according to claim 7, wherein third and fourth screw elements are threadably carried by the setscrew and include respective locating surfaces facing each other and operable to clamp the headlight bearing part therebetween.

9. An adjusting assembly according to claim 6, wherein the first screw element comprises a disk-shaped base element, with which a nut is connected as a handling aid.

10. An adjusting assembly according to claim 6, wherein the pot-shaped base element and nut are connected with each other by beading.

11. An adjustable fixing element, comprising:
    a setscrew;
    a first screw element having a locating surface disposed on said setscrew;
    a second screw element having a locating surface disposed on said setscrew, wherein said first screw element locating surface opposes said second screw element locating surface;
    said first screw element including a disk-shaped base element and a first nut that extends beyond said first screw element locating surface;
    said second screw element including on said second screw element locating surface a pot-shaped base element defining a cavity therein, said first nut received within said cavity; and
    a second nut having a collar disposed on said setscrew, wherein said collar is received through an aperture defined by said pot-shaped base element and is connected to said pot-shaped base element in an axial direction.

12. The adjustable fixing element of claim 11 wherein said pot-shaped base element and said second nut are connected to each other by flanging.

13. The adjustable fixing element of claim 11 wherein said setscrew is disposed through an aperture defined by a fixed vehicle body part, said fixed vehicle body part disposed between said locating surfaces of said first and second screw elements and wherein a third and a fourth screw element are threadably carried by said setscrew, said third and fourth screw elements including respective locating surfaces opposing each other and further wherein a headlight bearing part is disposed between said third and fourth screw element opposing locating surfaces, said third and fourth screw elements disposed on said setscrew on an opposite side of said fixed vehicle body part from said first nut.

* * * * *